US007782353B2

(12) United States Patent
Kato et al.

(10) Patent No.: US 7,782,353 B2
(45) Date of Patent: Aug. 24, 2010

(54) IMAGE-FORMING DEVICE

(75) Inventors: Ryota Kato, Nagoya (JP); Jun Mihara, Nagoya (JP); Yasuo Tamaru, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 11/614,841

(22) Filed: Dec. 21, 2006

(65) Prior Publication Data

US 2007/0165097 A1      Jul. 19, 2007

(30) Foreign Application Priority Data

Dec. 27, 2005   (JP)   ............... 2005-375586

(51) Int. Cl.
| B41J 2/385 | (2006.01) |
|---|---|
| B41J 2/41 | (2006.01) |
| B41J 15/14 | (2006.01) |
| B41J 2/435 | (2006.01) |
| B41J 27/00 | (2006.01) |

(52) U.S. Cl. ................... 347/242; 347/134; 347/137; 347/138; 347/152; 347/241; 347/243; 347/245; 347/256; 347/257; 347/259; 347/260; 347/261; 347/263

(58) Field of Classification Search ................ None
See application file for complete search history.

(56) References Cited

U.S. PATENT DOCUMENTS

| 5,124,830 | A | * | 6/1992 | Omura et al. | ............... | 359/219 |
| 5,801,746 | A | * | 9/1998 | Yamaguchi et al. | ......... | 347/259 |
| 6,266,498 | B1 | * | 7/2001 | Oda et al. | ..................... | 399/92 |
| 6,708,011 | B2 | * | 3/2004 | Nomura et al. | ............. | 399/110 |

(Continued)

FOREIGN PATENT DOCUMENTS

JP   S63-074020 A   4/1988

(Continued)

OTHER PUBLICATIONS

Japan Patent Office; Office Action in Japanese Patent Application No. 2005-375586 (counterpart to the above-captioned U.S. patent application) mailed Apr. 21, 2009.

(Continued)

*Primary Examiner*—Matthew Luu
*Assistant Examiner*—Kendrick X Liu
(74) *Attorney, Agent, or Firm*—Baker Botts L.L.P.

(57) ABSTRACT

An image-forming device has cylindrical image-carrying members, and an optical scanning unit. The cylindrical image-carrying members are in a main casing for rotating about respective rotational axes which are parallel to one another and juxtaposed in a single direction. The optical scanning unit is in the main casing and has laser generators, a rotatable polygon mirror, mirrors, and lenses. The laser generators have a one-to-one relationship to the image-carrying members to emit laser beams. The rotatable polygon mirror deflects the respective laser beams to scan the respective image-carrying members. The mirrors have a one-to-one relationship to the image-carrying members to guide the respective laser beams along respective optical paths to the respective image-carrying members. The lenses have a one-to-one relationship to the plurality of image-carrying members provided in the respective optical paths and between the respective mirrors and the respective image-carrying members.

9 Claims, 5 Drawing Sheets

U.S. PATENT DOCUMENTS

| | | | |
|---|---|---|---|
| 6,768,886 B2 * | 7/2004 | Nakazato et al. | 399/111 |
| 6,888,654 B2 * | 5/2005 | Cannon et al. | 359/204 |
| 2004/0036936 A1 * | 2/2004 | Nakajima et al. | 359/204 |
| 2005/0053388 A1 | 3/2005 | Yokoyama et al. | |
| 2005/0190420 A1 | 9/2005 | Imai et al. | |

FOREIGN PATENT DOCUMENTS

| | | |
|---|---|---|
| JP | H05-346550 A | 12/1993 |
| JP | H08-0174969 A | 7/1996 |
| JP | H09-190038 A | 7/1997 |
| JP | 2001-337510 A | 12/2001 |
| JP | 2003-0015378 A | 1/2003 |
| JP | 2003-0255660 A | 9/2003 |
| JP | 2004-012550 A | 1/2004 |
| JP | 2004-0109456 A | 4/2004 |
| JP | 2004-0145228 A | 5/2004 |
| JP | 2004-287728 A | 10/2004 |
| JP | 2005-092179 A | 4/2005 |
| JP | 2005-0234061 A | 9/2005 |
| JP | 2005-238584 A | 9/2005 |
| JP | 2005-0242024 A | 9/2005 |
| JP | 2002-0328327 A | 11/2005 |

OTHER PUBLICATIONS

Partial translation and description of Office Action describing relevance of Japanese Patent Application Pub. No. 2000-235287, counterpart application to Patent No. US 6266498A, previously submitted in an IDS on Feb. 20, 2007.

Partial translation and description of Office Action describing relevance of Japanese Patent Application Pub. No. 2000-235287, counterpart application to Patent No. US 6708011A, previously submitted in an IDS on Feb. 20, 2007.

Partial translation and description of Office Action describing relevance of Japanese Patent Application Pub. No. 2003-107838 A, counterpart application to Patent No. US 6708011A, previously submitted in an IDS on Feb. 20, 2007.

* cited by examiner

IMAGE-FORMING DEVICE

CROSS REFERENCE TO RELATED APPLICATIONS

This application claims priority from Japanese Patent Application No. 2005-375586 filed Dec. 27, 2005. The entire content of the priority application is incorporated herein by reference.

TECHNICAL FIELD

The disclosure relates to an image-forming device, and particularly, to a laser printer which facilitates an adjustment of mirrors in an optical scanning unit.

BACKGROUND

A tandem image-forming device having a plurality of image-carrying members juxtaposed in a single direction are well known in the art. Japanese Patent Application Publication No. 2004-145228 discloses a tandem image-forming device having four image-carrying members, and an optical scanning unit to scan a laser beam to each image-carrying member, The optical scanning unit is arranged parallel to a plane occupied by the four image-carrying members in order to minimize the device.

The optical scanning unit includes a set of reflecting mirrors for each image-carrying member. Generally, the distance between the image-carrying member and the nearest reflecting mirror of the corresponding set differs among all image-carrying members Consequently, the sensitivity for adjusting the reflecting mirrors is different from one another, making the operations for adjusting the reflecting mirrors more complex.

It is an object of the present invention to provide an image-forming device that facilitates the adjustment of a reflecting mirror in an optical scanning unit.

SUMMARY

The present invention provides an image-forming device having a plurality of cylindrical image-carrying members, and an optical scanning unit. The plurality of cylindrical image-carrying members is provided in a main casing for rotating about respective rotational axes. The rotational axes are parallel to one another and juxtaposed in a single direction. The optical scanning unit is provided in the main casing and has a plurality of laser generators, a single rotatable polygon mirror, a plurality of mirrors, and a plurality of lenses. The plurality of laser generators is provided one-to-one relationship to the plurality of image-carrying members to emit respective laser beams. The single rotatable polygon mirror deflects the respective laser beams to scan the respective image-carrying members therewith. The plurality of mirrors is provided one-to-one relationship to the plurality of image-carrying members to guide the respective laser beams along respective optical paths to the respective image-carrying members. The plurality of lenses is provided one-to-one relationship to the plurality of image-carrying members and provided in the respective optical paths and between the respective mirrors and the respective image-carrying members., Distances from the respective mirrors to the respective image-carrying members being equal to one another.

BRIEF DESCRIPTION OF THE DRAWINGS

Illustrative aspects in accordance with the invention will be described in detail with reference to the following figures wherein.

DETAILED DESCRIPTION

Figure 1:
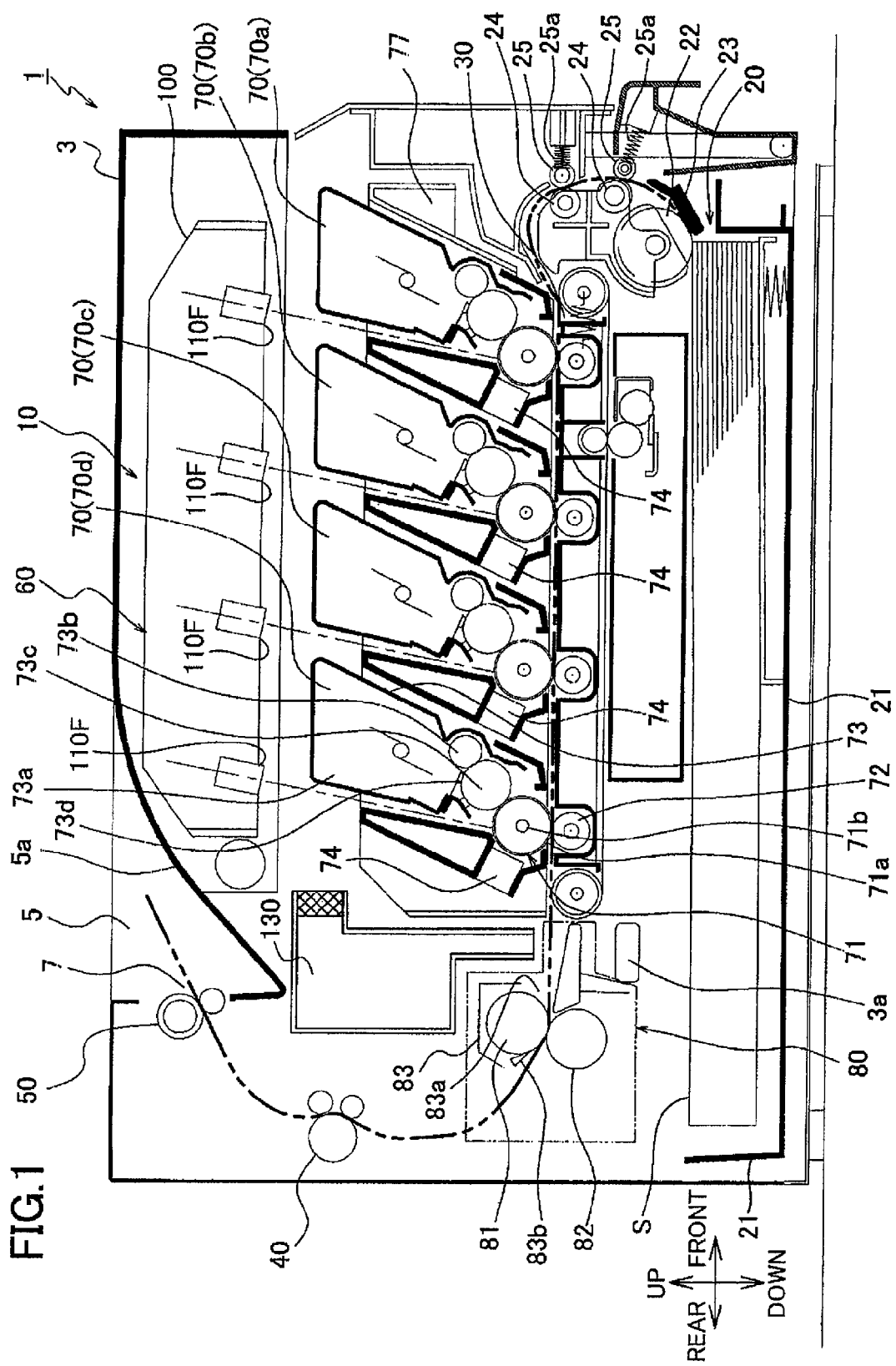
FIG. 1 is a side cross-sectional view showing a laser printer according to the present invention.

An image-forming device according to some aspects of the invention will be described while referring to the accompanying drawings wherein like parts and components are designated by the same reference numerals to avoid duplicating description. In the following description, the expressions "front", "rear", "above", "below", "right", and "left" are used throughout the description to define the various components when the image-forming device is disposed in an orientation in which it is intended to be used.

FIG. 1 shows a direct tandem-type color laser printer 1 for printing in color, and having a feeder unit 20 for feeding a sheet S, and an image-forming unit 10 for forming an image on the sheet S fed by the feeder unit 20.

The laser printer 1 further has a substantially box-shaped (cube-shaped) main casing 3 accommodating the feeder unit 20 and the image-forming unit 10. The main casing 3 has a discharge tray 5 and a discharge opening 7. The discharge tray 5 is provided on the top surface of the main casing 3 for receiving a recording sheet or a transparency film that is discharged from the main casing 3 after a printing operation. The discharge tray 5 includes a sloped surface 5a sloping down from the top surface of the main casing 3 toward the rear side thereof, The discharge opening 7 is formed in the main casing 3 on the rear side of the sloped surface 5a for allowing the recording sheet to be discharged after printing.

The main casing 3 further includes a frame member (not shown) formed of metal or synthetic resin for accommodating the image-forming unit 10 inside thereof. The developing units 70 and the fixing unit 80 are detachably mounted in the frame member.

The feeder unit 20 includes a paper tray 21, a feeding roller 22, a separating pad 23, a conveying roller 24, a pressure roller 25, and a coil spring 25a. The paper tray 21 is housed in the lowest section of the main casing 3. The paper tray 21 accommodates a plurality of recording sheets S in a stacked manner. The feeding roller 22 is disposed above the front end of the paper tray 21 for feeding and conveying the recording sheet S in the paper tray 21 to the image-forming unit 10. The separating pad 23 is disposed, opposing the feeding roller 22 for applying a prescribed conveying pressure to the recording sheet S to ensure that the recording sheet is separated and fed one sheet at a time. The feeder unit 20 also includes a manual feed tray 26 rotatably supported by a lower end thereof.

The recording sheet S stacked in the paper tray 21 is fed along a U-shaped path in the front part of the main casing 3 and conveyed to the image-forming unit 10 positioned substantially in the center of the main casing 3. The conveying roller 24 is disposed in the curved portion of the U-shaped path and applies a conveying force to the recording sheet S for conveying the recording sheet S along the curved path toward the image-forming unit 10.

The pressure roller 25 is disposed to oppose the conveying roller 24 for pressing the recording sheet S interposed between the conveying roller 24 and pressure roller 25 against the conveying roller 24. The coil spring 25a functions to press the pressure roller 25 (follow roller) toward the conveying roller 24.

The feeder unit 20 further includes a conveying belt 30, an intermediate conveying roller 40, and discharge rollers 50 disposed inside the main casing 3. The conveying belt 30 supports and conveys the recording sheet S to the four developing units 70a, 70b, 70c, and 70d in turn. The intermediate conveying roller 40 functions to convey the recording sheet S discharged from the image-forming unit 10 through the fixing unit 80 to the discharge roller 50, and to remove the curling imparted to the recording sheet in the image-forming unit 10. The discharge roller 50 receives the recording sheet S and discharges the recording sheet S through the discharge opening 7 onto the discharge tray 5.

The image-forming unit 10 includes an optical scanning unit 60, four photosensitive drums 71, and four developing units 70a, 70b, 70c, and 70d, and a fixing unit 80. The optical scanning unit 60 scans image on each of four photosensitive drums 71 by a laser beam. Each developing unit 70 develops image on the photosensitive drum 71 and transfers the image on the sheet S. The fixing unit 80 fixes the image on the sheet.

Figure 2:
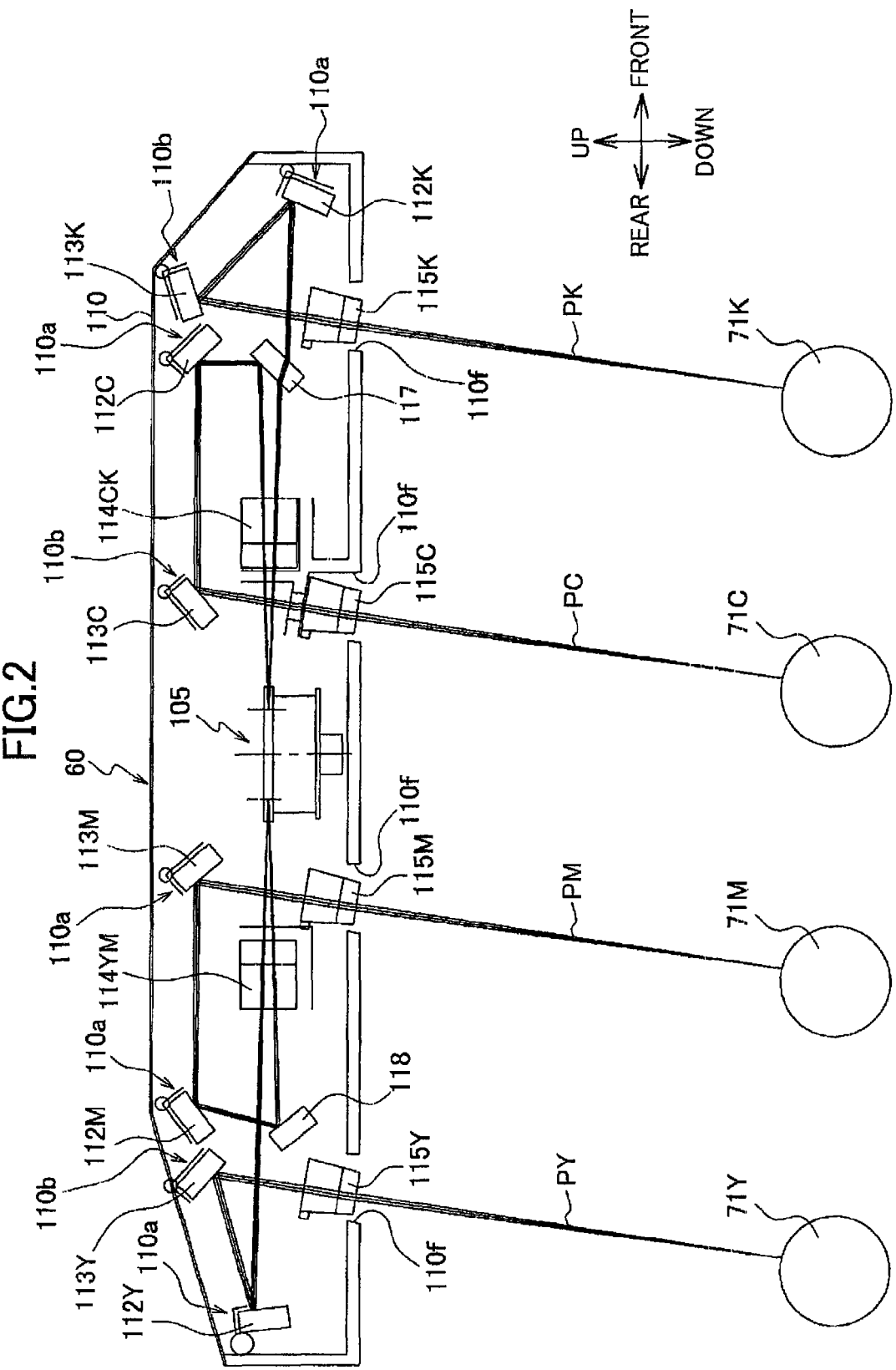
FIG. 2 is a side cross-sectional view showing an optical scanning unit and photosensitive drums.

As shown in FIG. 1, the scanning unit 60 is disposed in the upper section of the main casing 3, and functions to form an electrostatic latent image on each of the photosensitive drums 71. Referring to FIG. 2, the scanning unit 60 includes four laser generators 102Y, 102M, 102C, and 102K for each of colors; yellow, magenta, cyan, and black; and four optical systems PY, PM, PC, and PK for guiding a laser beam emitted from each of the laser generator's to the corresponding photosensitive drum 71 in a casing 100. The four optical systems share one polygon mirror 105 to deflect the laser beam from the laser generators 102.

The laser generators 102Y, 102M, 102C, and 102K emit a laser beam for forming yellow (Y), magenta (M), cyan (C), and black (K) single-color images, respectively. The laser generators 102 are provided at different positions in the casing 100. More specifically, the laser generators 102K and 102Y are arranged in the front-to-rear direction in the center right region of the casing 100 for emitting laser beams leftward. The laser generator 102M is disposed in the right rear section of the casing 100 for emitting a laser beam in the forward direction, while the laser generator 102C is disposed in the right front section of the casing 100 for emitting a laser beam in the rearward direction. The laser generators 102Y, 102M, 102C, and 102K emit laser beams independently at timings corresponding to image data for the respective colors yellow (Y), magenta (M), cyan (C), and black (K).

Four collimator lenses 103Y, 103M, 103C, and 103K are provided in front of the corresponding laser generator 102 for converting the light beam emitted from the laser generators 102 into a parallel beam. A mirror 116M is provided to reflect the laser beam emitted from the laser generator 102M leftward and pass the laser beam from the laser generator 102Y. And, another mirror 116C is provided to reflect the laser beam emitted from the laser generator 102C leftward and pass the laser beam from the laser generator 102K. Two cylindrical lenses 104YM and 104CK are provided to refract the laser beams coming from the mirrors 116M and 116C to the polygon mirror 105.

As shown in FIG. 2, the scanning unit 60 has a frame 110 supporting the four optical systems P for each of the colors; yellow (Y), magenta (M), cyan (C), and black (K) arranged in order from the rear to the front in the casing 100. The polygon mirror 105 is arranged between the second optical system for magenta and the third optical system for cyan, and is driven to rotate by a polygon motor (not shown) In other words, the polygon mirror 105 is positioned in a center portion of the casing 100. The polygon mirror 105 functions to deflect four laser beams emitted from the laser generators 101 to the corresponding photosensitive drum 71.

The frame 110 is formed asymmetrically with respect to a vertical direction passing through the polygon mirror 105 in the front-to-rear direction (see FIG. 2). The casing 100 has four apertures 110f on a bottom surface thereof for each optical system P. Each aperture 110f is positioned above and forward with respect to the corresponding photosensitive drum 71.

Each optical system P includes a pair of mirrors 112 and 113 for guiding the laser beam deflected by the polygon mirror 105 to the photosensitive drum 71 between the polygon mirror 105 and the photosensitive drum 71. The mirrors 112 and 113 are provided so that their positions and orientations can be adjusted.

Through reflection by the mirrors 112 and 113, in the optical system PY for yellow, the laser beam emitted from the laser generator 102Y and deflected by the polygon mirror 105 is reflected off the mirror 112Y and the mirror 113Y to irradiate onto the photosensitive drum 71Y.

The optical system PM further includes a mirror 118 between the polygon mirror 105 and the mirror 112M, so that the laser beam emitted from the laser generator 102M and deflected by the polygon mirror 105 is first reflected by the mirror 118 and subsequently reflected by the mirrors 112M and 113M to irradiate onto the photosensitive drum 71M.

The optical system PC further includes a mirror 117 between the polygon mirror 105 and the mirror 112C, so that the laser beam emitted from the laser generator 102C and deflected by the polygon mirror 105 is first reflected by the mirror 112C and then reflected by the mirrors 112C and 113C to irradiate onto the photosensitive drum 71C.

The optical system PK shares the mirror 117 with the optical system PC, so that the laser light emitted from the laser generator 102K and deflected by the polygon mirror 105 is first deflected by the mirror 117 and subsequently reflected by mirrors 112K and 113K to irradiate onto the photosensitive drum 71K. Thus, each electrostatic latent image of the corresponding color is formed on the respective photosensitive drum 71.

A fθ lens 114YM for an fθ correction for the laser beam are provided on the optical paths from the polygon mirror 105 to the mirrors 112Y and 118. Another fθ lens 114CK for adjusting a traveling path of the laser beam is provided on the optical paths from the polygon mirror 105 to the mirror 117.

A Face tangle correcting lens 115 such as a toric lens for a face tangle correction is provided on each of the optical paths between the mirror 113 to the corresponding photosensitive drum 71. The face tangle correcting lenses 115 also partially contribute to deflection of the laser beam along the scanning surface.

Figure 3:
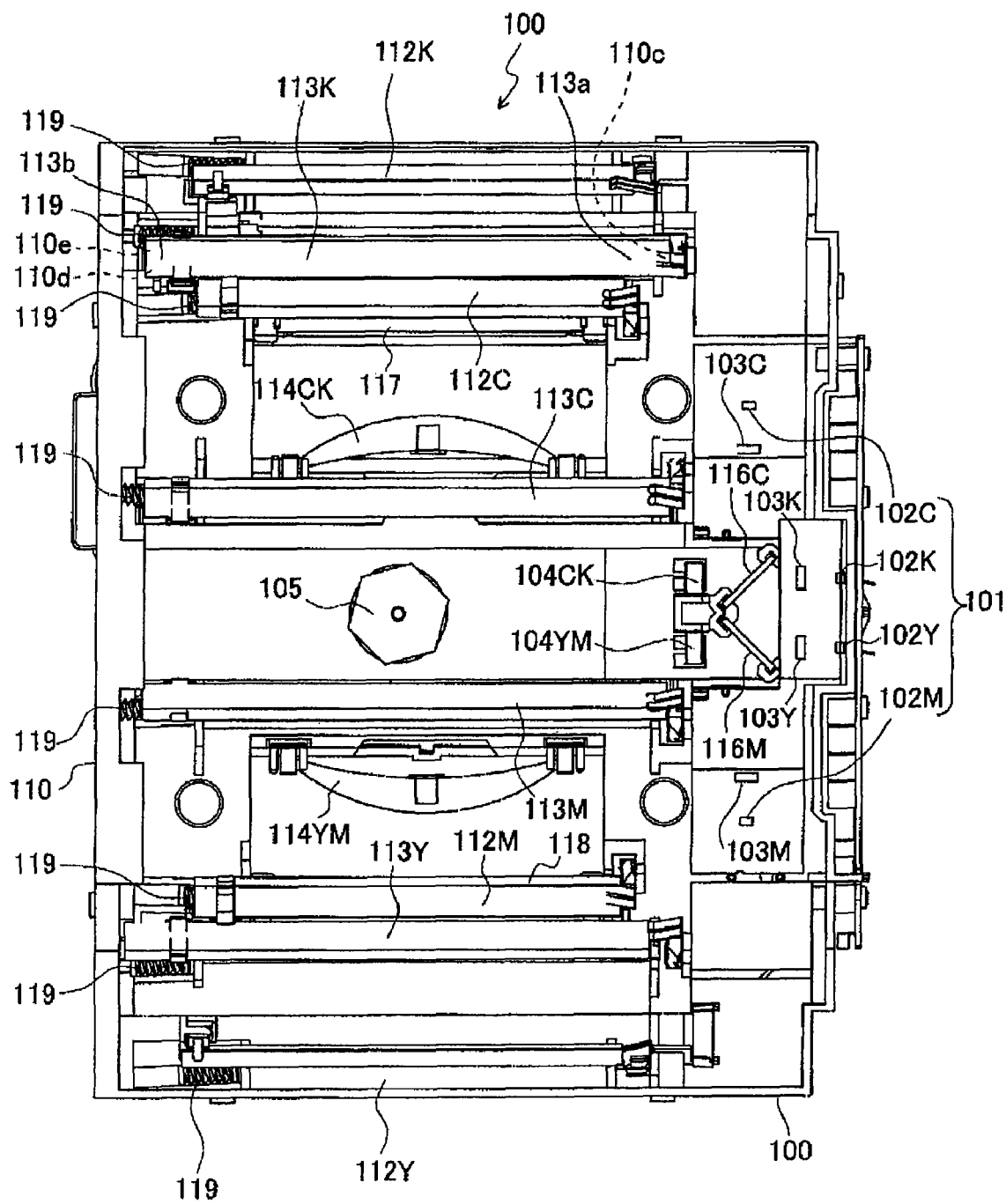
FIG. 3 is a plan view showing the scanning unit.
Figure 4:
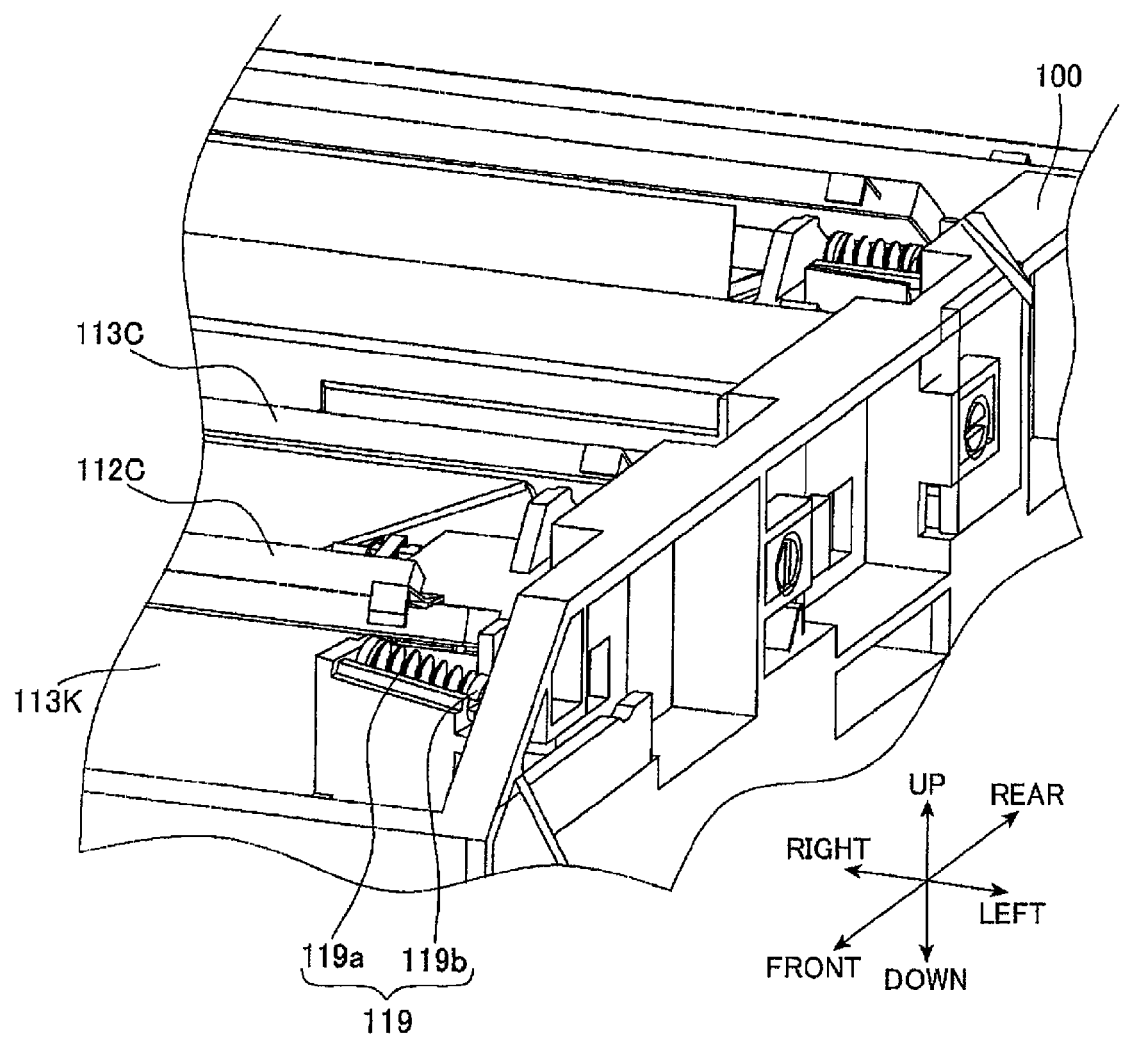
FIG. 4 is a partial perspective view showing an adjustment mechanism for a mirror.
Figure 5A:
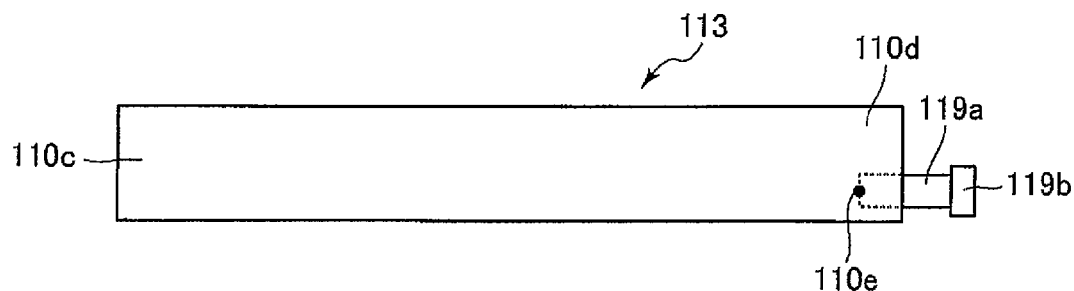
FIG. 5A is a plan view showing a relationship between the mirror and the adjustment mechanism.
Figure 5B:
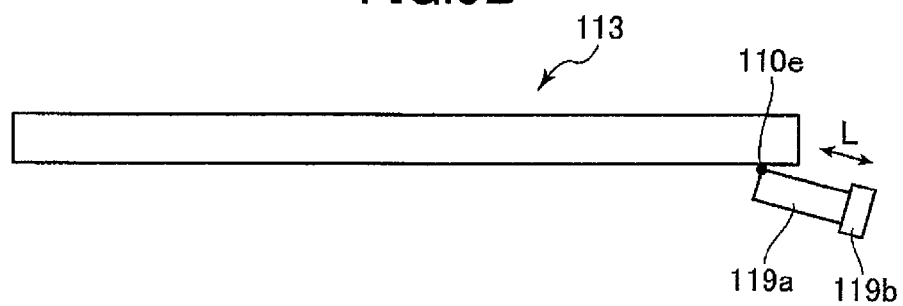
FIG. 5B is a side view showing a relationship between the mirror and the adjustment mechanism.

As shown in FIG. 2, the frame 110 of the scanning unit 60 is provided with four support parts 110a for supporting the mirrors 112 and four support parts 10b for supporting the mirrors 113. Each of the support parts 110a and 110b have a fixed point 110c for supporting the right end of the mirror 112 or 113 in the longitudinal direction (a right end 113a of the mirror 113K with respect to the longitudinal direction, as shown in FIG. 3), and a fixed point 110d and a variable point 110e for supporting the left end of the mirror 112 or 113 in the longitudinal direction (a left end 113b of the mirror 113 with respect to the longitudinal direction, as shown in FIG. 3) An adjustment pin 119 is provided at the variable point 110e. The support parts 110a and 110b for each color are arranged at wider intervals closer to the polygon mirror 105 so that the length of the optical paths from the polygon mirror 105 to each photosensitive drum 71 is the same for each color and so that the length of the optical paths of laser beams from the mirror 113 to the corresponding photosensitive drum 71 for each color is also the same. In the above structure, the mirror 113 is located at the nearest position to the photosensitive drum 71 among all mirrors in the corresponding optical system. In other words, the distance between the photosensitive drum 71 and the mirror 113 in the optical system is identical to that of the other optical systems As shown in FIG. 4, the adjustment pin 119 is provided on the frame 110 for adjusting the angles or orientations of the mirrors 112 and 113. The adjustment pin 119 is mounted on the frame 110 and includes a rod-shaped screw part 119a that is contact with and slanted with respect to the variable point 110e of the mirror 112 or 113, and a head part 119b formed on an end of the screw part 119a. By rotating the screw part 119a using a screwdriver on the head part 119b, the adjustment pin 119 can be advanced or retracted relative to the mirror 112 or 113 along a longitudinal direction L thereof to move the mirror 112 or 113 and change the angle or orientations of the mirror 112 or 113 in the respective optical system. FIG. 4 shows the adjustment pin 119 in an advanced state. The same number of the adjustment pins 119 as those of the mirrors 112 and 113 are provided on the left side of the frame 110 to adjust the angles or orientations of the mirrors 112 and 113.

As described above, the pin 119 is not perpendicular to but slanted with the main surface of the mirror 112 or 113, so that fine adjustment of the angle of the mirror 112 or 113 can be performed.

The next description will explain the structure of the developing units 70a-70d. Since the developing units 70a-70d have the same construction, differing only in the color of toner accommodated therein, only the structure of the developing unit 70d is described in the following description. Further, the developing units 70a-70d will be referred to collectively as the developing units 70 in the following description.

As shown in FIG. 1, the developing units 70 are disposed below the scanning unit 60 in the main casing 3 and are detachably mounted therein. Each developing unit 70 includes the photosensitive drum 71, a charger 74, a transfer roller 72, and a developer cartridge 73. The developing unit 70 also has a drum unit 77 that is detachably mounted in a unit-accommodating section of the main casing 3. The photosensitive drum 71 and charger 74 for each color are integrally provided in the drum unit 77. Developer cartridge 73 is also detachably mounted in the drum unit 77. The four developing units 70a, 70b, 70c, and 70d are juxtaposed along the conveying direction of the recording sheet S and correspond to the four colors black (K), cyan (C), magenta (M), and yellow (Y), respectively.

The photosensitive drum 71 is configured of a cylindrical main drum body 71a for carrying an image to be transferred onto the recording sheet S, and a drum shaft 71b for rotatably supporting the main drum body 71a. By mounting the drum unit 77 in and removing the drum unit 77 from the laser printer 1, the four photosensitive drums 71 can be integrally moved in the front-to-rear direction to be mounted in or removed from the laser printer 1.

The charger 74 is disposed diagonally above and rearward of the photosensitive drum 71 and opposes the photosensitive drum 71 at a prescribed distance so as not to contact the same. The charger 72 functions to charge the surface of the photosensitive drum 71.

The developer cartridge 73 includes a toner-accommodating chamber 73a for accommodating toner, a toner supply roller 73b for supplying toner onto the photosensitive drum 71, and a developing roller 73c. In this embodiment, toner having a positive charge is accommodated in each toner-accommodating chamber 73a. The developer cartridges 73 are disposed on the opposite side of the corresponding photosensitive drums 71 from the fixing unit 80.

The fixing unit 80 is disposed downstream of the photosensitive drum 71 positioned farthest downstream in the sheet-conveying direction and is detachably mounted in the casing 100. The fixing unit 80 functions to melt the toner transferred onto the recording sheet S with heat in order to fix the toner image to the sheet S.

More specifically, the fixing unit 80 includes a heating roller 81, and a pressure roller 82 disposed in opposition to the heating roller 81 on the opposite side of the sheet-conveying path.

The heating roller 81 and pressure roller 82 are rotatably supported in a casing 83 of the fixing unit 80. The casing 83 includes a medium inlet 83a formed as an opening in the casing 83 on the developing unit 70 side, and a medium outlet 83b through which the recording sheet is discharged after undergoing a fixing operation.

The image-forming unit 10 also includes an air duct 130 for passing air therethough and cooling the fixing unit 80 (see FIG. 1). The air duct 130 is disposed between the fixing unit 80 and the scanning unit 60 in the main casing 3.

The following is a description of how the image-forming unit 10 forms an image on the recording sheet S. As the photosensitive drum 71 rotates, the charger 74 applies a uniform positive polarity to the surface of the photosensitive drum 71. Subsequently, the scanning unit 60 irradiates a laser beam onto the surface of the photosensitive drum 71 in a high-speed scan, thereby forming an electrostatic latent image on the surface of the photosensitive drum 71 corresponding to an image to be formed on the recording sheet.

Next, positively charged toner carried on the surface of the developing roller 73c comes into contact with the photosensitive drum 71 as the developing roller 73c rotates, and is then supplied to the surface of the photosensitive drum 71 that has been scanned by the laser beam. In this way, the latent image on the photosensitive drum 71 is transformed into a visible image according to a reverse developing process so that a toner image is carried on the surface of the photosensitive drum 71.

Subsequently, toner images carried on the surfaces of the photosensitive drums 71 in each of the colors yellow, magenta, cyan, and black are sequentially transferred onto the recording sheet S by a transfer bias applied to the transfer rollers 72. After the toner images are transferred onto the recording sheet S, the recording sheet S is conveyed to the fixing unit 80. In the fixing unit 80, the toner of all colors is fixed to the recording sheet S by heat. Accordingly, the image-forming process is completed.

In the laser printer 1, the face tangle correcting lens 115 is positioned between the mirror 113 and the photosensitive drum 71 in each optical system P in the scanning unit 60, and the distance from the mirror 113 to the photosensitive drum 71 is uniform in each optical system P. This structure of the laser printer 1 facilitates adjustment of the mirrors 112 and 113, particularly the mirrors 113, in the scanning unit 60 and makes operations for setting the optical path within the effective range of the face tangle correcting lenses 115 uniform among all photosensitive drums 71.

The polygon mirror 105 is located between two optical systems PC, PK for cyan and black and the other two optical systems PM, PY for magenta and yellow to simultaneously reflect the laser beams to two different directions, making it possible to reduce the length of the optical path from the polygon mirror 105 to the respective photosensitive drum 71. This structure can reduce the height dimension of the laser printer 1 to make the laser printer 1 more compact. Further, the polygon motor for driving the polygon mirror 105 is positioned in the center of the scanning unit 60. By positioning the polygon motor, which is a source of heat, in the center of the scanning unit 60, the distribution of heat in the main casing 3 becomes more uniform.

With the above structure of the laser printer 1, four apertures 110f are formed in the casing 100 to allow the passage of laser beams. These apertures 110f are positioned on the opposite side of the fixing unit 80 with respect to the corresponding photosensitive drums 71 in the juxtaposed direction of the photosensitive drums 71. In this way, the fixing unit 80 is positioned away from the scanning unit 60 to prevent the heat generated by the fixing unit 80 from reaching the scanning unit 60, thereby reducing the effects of heat produced in the fixing unit 80 on the scanning unit 60.

In the laser printer 1, the scanning unit 60 includes the air duct 130 for cooling the fixing unit 80. The air duct 130 is positioned between the fixing unit 80 and the scanning unit 60. By removing heat generated by the fixing unit 80 in this way, it is possible to reduce the effects of heat from the fixing unit 80 to the scanning unit 60.

With the above structure of the laser printer 1, the casing 100 of the scanning unit 60 accommodates the laser generators 101, the polygon mirror 105, the four optical systems, each including a set of mirrors, and the four fθ lenses 114. Further, the polygon mirror 105 is centered in the casing 100. The discharge tray 5 is disposed adjacent to the top of the frame 110 in the scanning unit 60. Accordingly, the distance from the mirror 113 to the corresponding photosensitive drum 71 in the optical system can become equal among all optical systems. This construction facilitates the adjustment of angles and orientations of the mirrors 112 and 113 in the scanning unit 60. Further, the operations for setting the optical paths within the effective ranges of the fθ lenses 114 is uniform for all photosensitive drums 71. Further, by reducing the height dimension of the laser printer 1, it is possible to manufacture a more compact laser printer 1.

In the laser printer 1, each of the developer cartridges 73 is positioned on the opposite side of the corresponding photosensitive drums 71 from the fixing unit 80. By positioning the developer cartridges 73 away from the fixing unit 80 in this way, heat produced by the fixing unit 80 is prevented from reaching the developer cartridges 73, thereby reducing the effects of the heat on developer (toner) accommodated in the developer cartridges 73.

With the laser printer 1, the four photosensitive drums 71 can be moved integrally in the front-to-rear direction so as to be integrally mounted into or removed from the laser printer 1. This structure makes it possible to increase the space for accommodating the developer cartridges 73, while reducing the height dimension of the laser printer 1 to achieve a more compact laser printer 1.

In the laser printer 1, the scanning unit 60 is provided with adjustment pins 119 for adjusting each of the mirrors 112 and 113. The adjustment pins 119 are disposed on the left side in the frame 110 so that the operator can adjust the positioning of the mirrors 112 and 113 while viewing only one side of the scanning unit 60, and need not view both sides of the scanning unit 60. In other words, the operator or adjusting device (robot or jig) can perform operations from one side of the scanning unit 60.

In the laser printer 1, each adjustment pin 119 in the scanning unit 60 is mounted on the frame 110 and includes the adjustment pin 119 arranged at a slant to the variable point provided in the proximity to one end of each of the mirrors 112 and 113, and the head part 119b formed on an end of the screw part 119a. By rotating the screw part 119a using a screwdriver in the head part 119b, the operator can advance ox retract the adjustment pin 119 relative to the mirrors 112 and 113 to vary the angles or orientations of the mirrors 112 and 113. Accordingly, it is possible to adjust the angles or orientations of the mirrors 112 and 113 with accuracy. Further, since the screw part 119a is oriented at a slant to the variable point 110e provided on a surface of the mirrors 112 and 113, changes in the amount of tilt in the screw part 119a relative to advances and retractions of the screw part 119a are reduced to allow fine adjustments.

While the invention has been described in detail with reference to specific embodiments thereof, it would be apparent to those skilled in the art that many modifications and variations may be made therein without departing from the spirit of the invention, the scope of which is defined by the attached claims.

Figure 6:
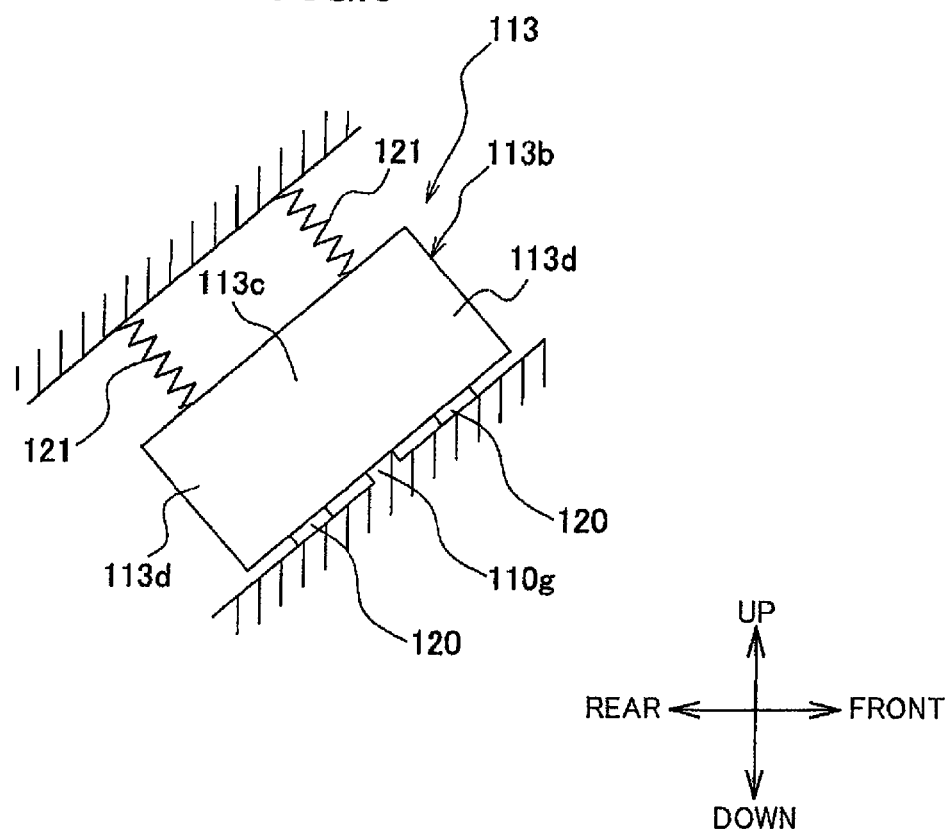
FIG. 6 is a side cross-sectional view showing another structure of the adjustment mechanism.

An ultraviolet curable resin may be used for adjusting the angles or orientations of the mirrors 112 and 113. In this case, as shown in FIG. 6, each mirror 112 or 113 has a glass plate and a reflecting surface formed on the glass plate. In the following description, the mirror 113 will be explained as one example. The reflecting film is not formed on the left end face 113b extending in the longitudinal direction of the mirror 113, so that ultraviolet rays can pass into the inside of the glass plate through the left end face 113b having no reflecting film. Other faces of the mirror 113 have reflecting film to prevent the passage of ultraviolet rays. A center 113c of the mirror 113 in the longitudinal direction is supported at a fixed point 110g of the frame 110, while each end 113d of the left end face 113b in the longitudinal direction is supported by an ultraviolet curable resin 120 that has not yet been cured. Further, spring members 121 are provided on the opposite side of fixed point 110g of the frame 110 to press the end 113d of the left end face 113b of the mirror 113 to the frame 110. After adjusting the angle and orientations of the mirror 113, ultraviolet light is irradiated from a position substantially above the left end face 113b. The ultraviolet light passes through the left end face 113b and cures the ultraviolet curable resin 120 supporting the mirror 113, thereby fixing the angle of the mirror 113 to the frame 110 in the adjusted position. In this way, the angle of the mirror can be adjusted with precision.

In the laser printer 1, the mirrors 113 are easily and readily adjusted. All mirrors 113 can be adjusted in the similar manner to one another.

The polygon mirror is substantially centered in the position among the plurality of reflecting mirrors. With this construction, the polygon mirror deflects laser light in two directions for the plurality of optical systems, thereby reducing the lengths of the optical paths from the polygon mirror to the image-carrying members. Consequently, this structure reduces the required height dimension, leading to a more compact image-forming device. Further, since the motor provided as a drive source for the polygon mirror is also a source of heat, positioning the polygon mirror centrally reduces the uneven heat distribution.

Positioning the fixing unit away from the optical scanning unit prevents heat generated in the fixing unit from reaching the optical scanning unit and decreasing the effects of heat produced from the fixing unit on the optical scanning unit. It is possible to reduce the effects of heat produced from the fixing unit on the optical scanning unit.

Developer such as toner employed in the developing unit is particularly susceptible to the effects of heat, melting and solidifying when subjected to considerable amounts of heat. The developing unit is positioned on the opposite side of the fixing unit with respect to the corresponding image-carrying member. Positioning the developing units farther away from the fixing unit prevents the heat produced at the fixing unit from reaching the developing units, thereby reducing the effects of the heat on developer in the developing units.

It is also possible to provide a casing for the optical scanning unit and to form a discharge tray on an upper portion of the casing. The distances between corresponding reflecting mirrors and image-carrying members are set equally. Accordingly, this arrangement facilitates adjustments for reflecting mirrors in the optical scanning system, makes the operations for positioning the optical paths within the effective ranges of the lenses uniform among the image-carrying members, and reduces the height of the image-forming device.

It is possible to configure the plurality of image-carrying members so that the image-carrying members are moved as a unit in the juxtaposed direction when mounting the members in or removing the members from the image-forming device. This construction increases the space available for housing the developing units and reduces the height dimension of the image-forming device, producing an overall compact image-forming device.

It is possible to dispose the mechanisms for adjusting the reflecting mirrors on one side of the optical scanning unit. This facilitates adjustment operations, since the operator can adjust the mirrors while viewing only one side of the optical scanning unit, rather than both sides. In other words, the operator or adjusting device (robot or jig) can perform operations from one side of the optical scanning unit.

Hence, the reflecting mirrors can be adjusted with great accuracy. Each reflecting mirror is supported with one end fixed and the other variable. An adjusting bar member is provided in contact with the variable end of the reflecting mirror. The adjusting bar member can be formed as a screw that is rotated from one end thereof to adjust the angle of the mirror.

What is claimed is:

1. An image-forming device comprising:
   a main casing; and
   a plurality of image-carrying members, provided in a main casing, for rotating about respective rotational axes, and juxtaposed in a single direction; and
   an optical scanning unit provided in the main casing comprising:
      a plurality of laser generators provided one-to-one relationship to the plurality of image-carrying members to emit respective laser beams;
      a single rotatable polygon mirror that deflects the respective laser beams to scan the respective image-carrying members therewith;
      a plurality of mirrors wherein each of the plurality of mirrors corresponds to one of the plurality of image-carrying members to guide the respective laser beams along respective optical paths to the respective image-carrying members; and
      a plurality of lenses, wherein each of the plurality of lenses corresponds to one of the plurality of image-carrying members, and each lens of the plurality of lenses is provided in the respective optical path of the corresponding image-carrying members, and between the respective mirrors and the respective image-carrying members, and wherein distances from the respective mirrors to the respective image-carrying members are substantially equal to one another for each corresponding mirror and image-carrying member, wherein
   the optical scanning unit comprises:
      a plurality of adjusting mechanisms having a one-to-one relationship to the plurality of mirrors for adjusting orientations of the respective mirrors, wherein each of the plurality of mirrors has a transmittance portion that allows light to pass through;
      a plurality of first support portions provided one-to-one relationship to the plurality of mirrors for supporting the respective mirrors; and
      a plurality of second support members formed from an ultraviolet curable resin and provided between the respective first support portions and the respective transmittance portions, the plurality of second support members being cured by ultraviolet light passing through the respective transmittance portions to support the respective mirrors between the respective first support portions and the respective transmittance portions.

2. The image-forming device according to claim 1, wherein the optical scanning unit has a casing accommodating the plurality of the laser generators, the polygon mirror, the plurality of mirrors, and the plurality of lenses, and the polygon mirror is positioned in a center portion of the casing.

3. The image-forming device according to claim 1, further comprising:
   a plurality of developing units, wherein each of the plurality of developing units corresponds to one of the plurality of image-carrying members, to develop a scanned image on the respective image-carrying members and to transfer a developed image to a recording medium; and
   a fixing unit that fixes the transferred developed image to the recording medium,
   wherein the casing has a plurality of apertures and each aperture corresponds to one of the plurality of image-carrying members, wherein the apertures allow the respective laser beams to pass to the respective image-carrying members therethrough, and
   each of the plurality of apertures is provided on an opposite side of the fixing unit with respect to a corresponding image-carrying member.

4. The image-forming device according to claim 3, further comprising a cooling unit provided between the fixing unit and the optical scanning unit for cooling the fixing unit.

5. The image-forming device according to claim 3, wherein the plurality of developing units supply developer of different colors to the respective image-carrying members, and each of the developing units is positioned on the opposite side of the fixing unit with respect to the corresponding image-carrying member.

6. The image-forming device according to claim 2, further comprising a discharge tray provided in an upper surface of the main casing for receiving a recording medium after an image has been formed thereon, wherein the main casing has a nonuniform height along a single direction.

7. The image-forming device according to claim 1, wherein the plurality of image-carrying members is attachable to and detachable from the main casing and is movable integrally in the single direction.

8. The image-forming device according to claim 1, wherein each of the plurality of adjusting mechanisms is positioned on one end of the respective mirrors.

9. The image-forming device according to claim 1, wherein each of the plurality of mirrors comprises a plurality of mirror members arranged along the respective optical paths to the respective image-carrying members, the plurality of mirror members includes a mirror member arranged closest to the respective image-carrying members, distances between the respective closest mirrors and the respective image-carrying members are substantially equal to one another.

* * * * *